(No Model.) 3 Sheets—Sheet 1.
A. M. BUTZ.
APPARATUS FOR REGULATING STEAM IN BOILERS.
No. 441,745. Patented Dec. 2, 1890.
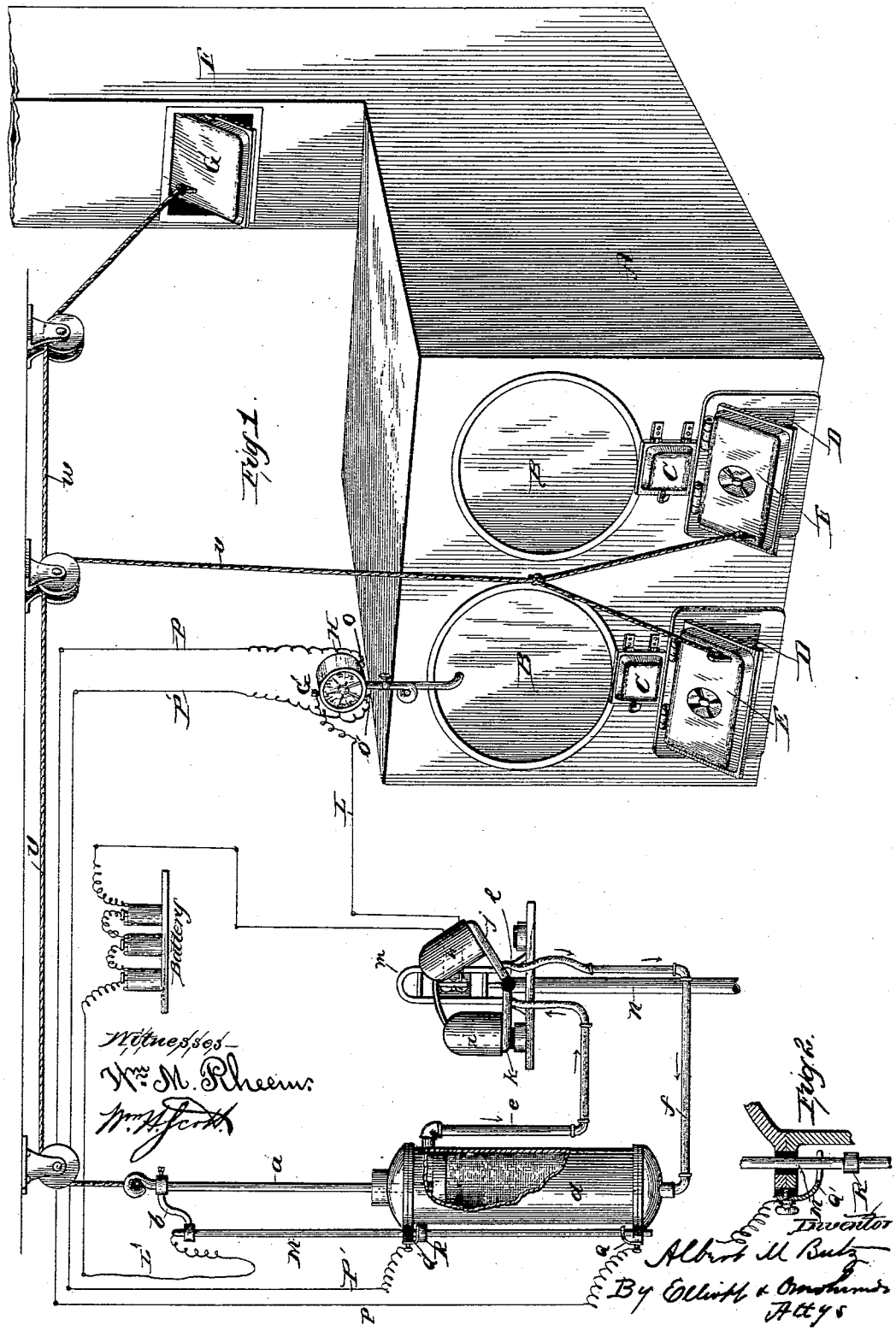

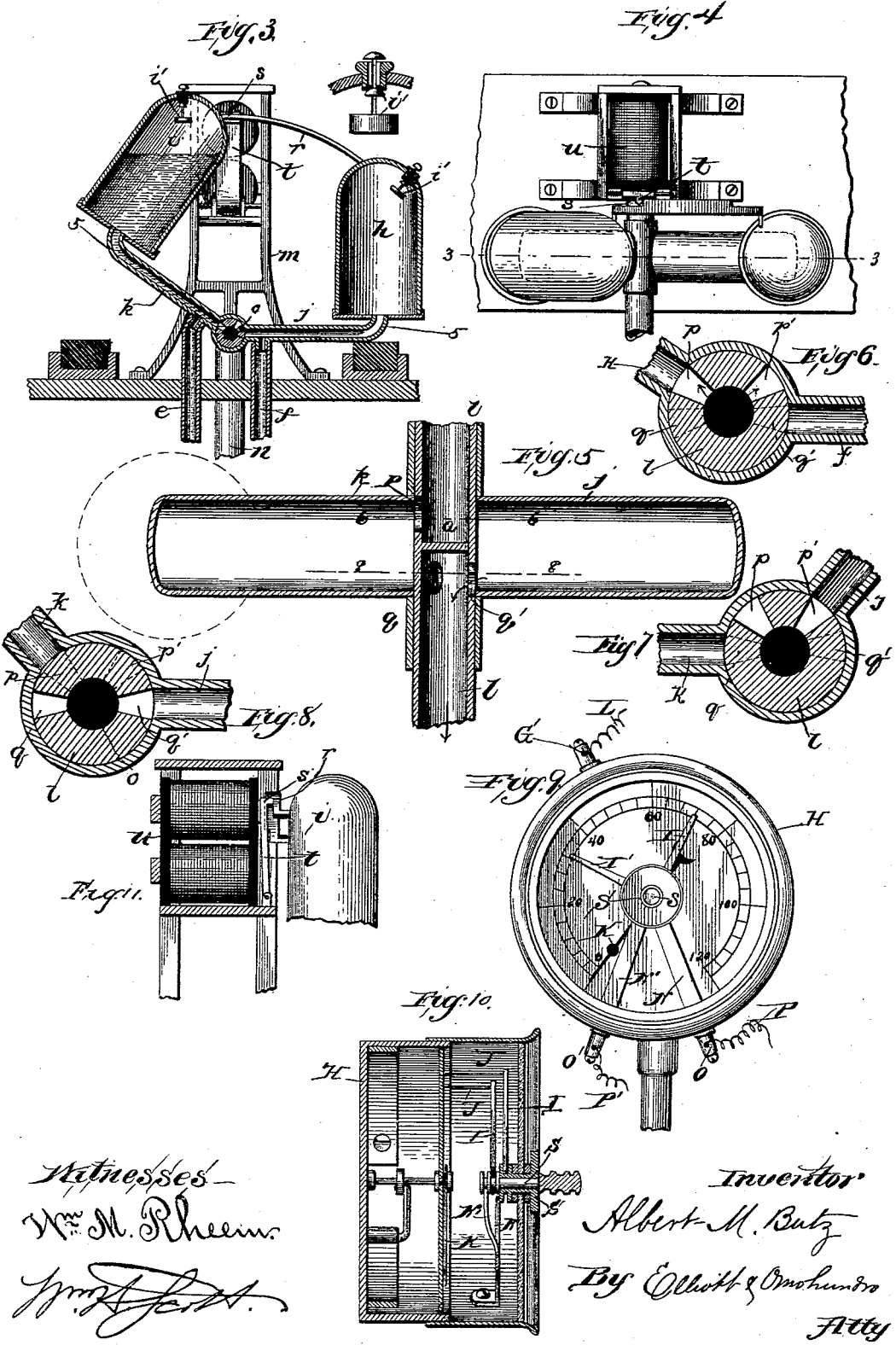

(No Model.) 3 Sheets—Sheet 3.
A. M. BUTZ.
APPARATUS FOR REGULATING STEAM IN BOILERS.
No. 441,745. Patented Dec. 2, 1890.
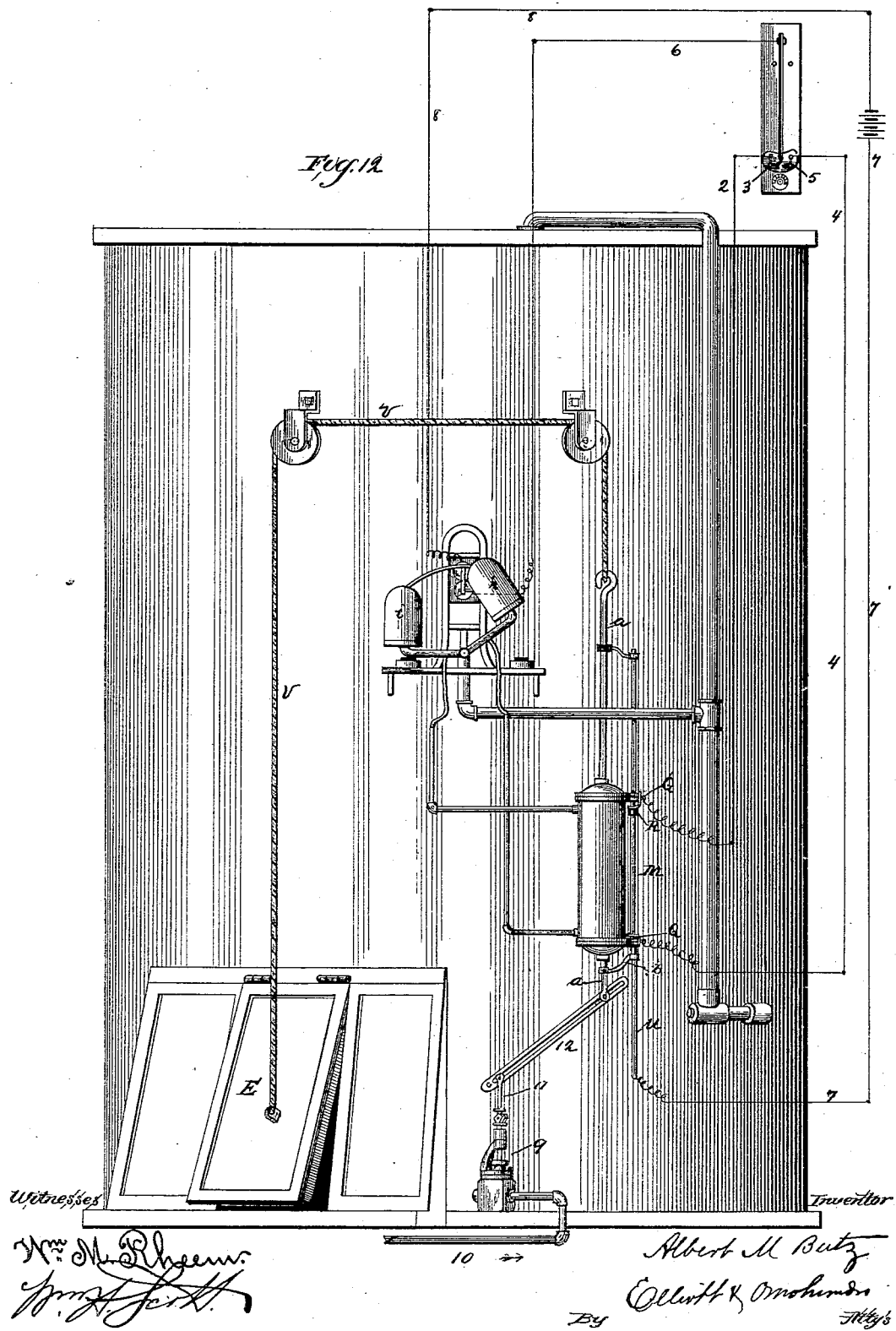

UNITED STATES PATENT OFFICE.

ALBERT M. BUTZ, OF CHICAGO, ILLINOIS, ASSIGNOR TO THE CONSOLIDATED TEMPERATURE CONTROLLING COMPANY, OF MINNESOTA.

APPARATUS FOR REGULATING STEAM IN BOILERS.

SPECIFICATION forming part of Letters Patent No. 441,745, dated December 2, 1890.

Application filed October 12, 1889. Serial No. 326,829. (No model.)

*To all whom it may concern:*

Be it known that I, ALBERT M. BUTZ, a citizen of the United States, and a resident of Chicago, in the county of Cook and State of Illinois, have invented certain new and useful Improvements in Apparatus for Regulating Steam in Boilers, of which the following is a specification.

This invention relates to improvements in apparatus for regulating and controlling the pressure of steam in boilers, and has for its prime object to regulate the pressure of the steam by controlling the fire of the boiler as distinguished from regulating the pressure by safety-valves or other devices.

Another object is to have the apparatus of such a character that when steam is raised to the desired pressure the drafts of the furnace will be automatically changed so that the fire will gradually cool down, but immediately the steam-pressure is reduced to the lowest desired limit the drafts will be opened so as to cause the fire to again burn up.

A further object is to utilize the pressure of the steam or the heat generated by the furnace for controlling and operating the apparatus, by means of which the dampers of the furnace are automatically operated.

These objects are attained by the devices illustrated in the figures of the accompanying drawings, in which—

Figure 1 represents a perspective view of a steam-boiler and furnace, showing apparatus applied thereto embodying my invention; Fig. 2, an enlarged detail view taken through the portion of the water-cylinder, showing the insulation of the contact-points and sliding contact-bar; Fig. 3, an enlarged detail vertical section on the line 3 3 of Fig. 4; Fig. 4, a plan view thereof; Fig. 5, a horizontal section on the line 5 5 of Fig. 3, more clearly showing the location of the inlet and outlet ports; Fig. 6, an enlarged detail section through the inlet-ports on the line 6 6 of Fig. 5 with the parts in position shown in Fig. 3, the location of the outlet-ports being shown in dotted lines; Fig. 7, a similar view showing the parts moved to the opposite position from Fig. 6; Fig. 8, a similar view to Fig. 6, but taken through the outlet-ports on the line 8 8 of Fig. 5; Fig. 9, a detail face view of my electric steam-gage; Fig. 10, a vertical section thereof; Fig. 11, an enlarged detail side elevation more clearly showing the location and operation of the electric magnets and the armature-catch thereof; and Fig. 12, a front elevation of a gas-furnace, illustrating the embodiment in my invention of a thermostat for controlling the operating apparatus thereof for the damper, and also the adaptation of my invention to the automatic actuation of a valve governing the supply of gas to such a furnace.

Similar letters of reference indicate the same parts in the several figures of the drawings.

Referring by letter to the accompanying drawings, A indicates an ordinary furnace; B, the boilers thereof; C, the fire-box; D, the ash-pit; E, the draft-doors of the ash-pit; F, the smoke-stack, and G a check-draft located in the smoke-stack.

The principle upon which my invention operates is that the simultaneous opening of the draft-doors E of the ash-pit and the closing of the check-draft D in the smoke-stack cause the fire in the furnace to burn up and therefore make more steam, while the simultaneous closing of the draft-doors and opening of the draft-check cause the fire to die down or cool off and therefore make less steam, and it is to the regulation of these drafts by the steam-pressure that my invention is particularly directed. To this end a steam-gage H, of any suitable construction, is provided with an extra pair of adjustable insulated arms I I', radiating from the center thereof, as more clearly illustrated in Figs. 9 and 10, each of which is provided with flexible needles J, projecting into the path of movement of the indicator K, so as to make contact therewith whenever the indicator is moved past these arms. With the indicator, through a binding-post G, connects one terminal of the battery-wire L, the opposite terminal of which L', from the opposite side of the battery, connects with a vertical movable rod M, (the purpose and operation of which will be described farther on.) The needle-arms I I' are connected by bars N N' with the binding-post O O', with which connect the ends of wires P P', leading to and terminating at contact-springs Q Q', bifurcated at their ends so as to straddle the sliding rod M without making contact therewith, except when it is operated, so that the collar R thereof bears against one of the springs, as illustrated in Fig. 1. These contact-springs are insulated from their bearings, as shown in Fig. 2, as well as the rod, so that whenever the rod is moved and the collar thereof makes contact with either one of the springs the electric circuit will be completed therethrough, but at no other time, the rod being moved vertically in its insulated bearings by the apparatus hereinafter described.

The needle-arms I I' are made adjustable in substantially the same manner as are the hands of a clock, one of them I' being attached to the inner end of a central arbor S, with which the bar N' connects, and the outer end of which terminates in a suitable knob for the manipulation thereof by the fingers, while the other I is attached to an insulated sleeve S', working upon the arbor and also manipulated by a thumb-piece, with which sleeve connects the other bar N, so that these arms may be set independently of each other, one to determine the highest and the other the lowest pressure of steam desired in the boiler.

The sliding bar M is operated by means of piston-rod $a$ through the medium of a connecting-arm $b$, the piston $c$ of which works in a closed cylinder $d$, at each end of which beyond the stroke of the piston connects pipes $e$ and $f$, leading thereto from a water-motor $g$, consisting of two balanced cylindrical vessels $h$ $i$, supported upon the outer ends of pipes $j$ $k$, projecting radially from and rocking in unison upon a fixed hollow shaft $l$, supported in brackets $m$ or any other well-known and convenient manner, with one end of which connects a water-supply pipe $n$, leading from a pump or ordinary water-main, while with the other end connects a waste or discharge pipe, not necessary to be shown. As more clearly illustrated in Figs. 3, 5, 6, and 7, this fixed hollow shaft $l$ is provided with a partition $o$ at the center of length thereof and at the center of width of the radial supporting-pipes $j$ $k$, on each side of which partition there are two ports $p$ $p'$ and $q$ $q'$, one of each pair of which leads to the pipes $j$ $k$. These ports are so arranged that when the inlet-port $p$ of the pipe $k$ is open or registers therewith the inlet-port of the pipe $j$ is closed or out of register, but the exhaust-port $q'$ thereof on the opposite side of the partition is open, while the exhaust-port $q$ of the pipe $k$ is closed. Thus when the supply of water is flowing into pipe $k$ the exhaust is flowing out of the pipe $j$, and, on the contrary, when the supply flows to the pipe $j$ the pipe $k$ is exhausting. The pipe $k$ is connected by means of the pipe $e$ with the water-cylinder $d$ above the piston, while the pipe $j$ is connected by the pipe $f$ with the cylinder below the piston, each of these connecting-pipes $e$ and $f$ being open and receiving their supply at the same time with the vessels $h$ $i$ and discharging the contents of the cylinder simultaneously with the discharge of the contents of the vessels through the discharge end of the pipe $l$, as just described.

The supporting-pipes $j$ $k$ project from the hollow shaft at an angle to each other in such manner that when one is lowered to a horizontal position the other will be simultaneously elevated, and vice versa, and in order to maintain these vessels in their elevated positions, at which time they are being filled, I provide a notched bar $r$, attached to and movable with the vessels, with which at each end of its stroke engages a catch $s$ on the armature $t$ of an electro-magnet $u$ included in the battery-circuit, and energized whenever the circuit is closed by the engagement of the indicator with one of the needle-arms of the steam-gage, as before described. Thus supposing the vessel $i$ to be locked in its elevated position, as illustrated in the drawings, the water from the supply-pipe will now flow into the vessel $i$ and simultaneously therewith through the pipe $e$ into the water-cylinder $d$ above the piston until both of them are filled, thereby simultaneously forcing the piston $c$ to the bottom of the cylinder, carrying with it the rod $m$ until the collar or projection R thereof engages the spring contact-point Q at the lower end of the cylinder.

The vessels $h$ and $i$ are preferably each provided with float-valves $i'$, of any well-known and suitable construction, which, while they permit the escape of air from the vessels while filling and admit the air into the vessels during the discharge of water, prevent the escape of water when the vessels are entirely filled, although the same object may be accomplished in any other manner. When, however, the magnet is energized so as to withdraw its armature and trip the rack $r$, the weight of the water in the vessel $i$ will cause the latter to fall to a horizontal position, simultaneously elevating the empty vessel $h$, which action closes the inlet-port of the vessel $i$ and opens the exhaust-port thereof, while it simultaneously opens the inlet-port for the vessel $h$ and closes the exhaust-port thereof, so that while the vessel $h$ is filling and the water simultaneously flowing through the pipe $f$ into the bottom of the cylinder $d$, elevating the piston thereof, the water is being discharged from the vessel $i$ and the cylinder above the piston through the pipe $e$.

In operation, with the parts in position shown in Fig. 1, with the vessel $i$ down empty and the cylinder empty above the piston, but the vessel $h$ full and the cylinder also full below the piston, which has also reached the limit of its upward movement and completed the electric circuit through the contact-spring Q', the draft-doors of the furnace are closed, while the check-draft is open and the fire is gradually dying down, and consequently reducing the steam-pressure. As soon as the steam-pressure reaches the lowest limit, at which time the indicator will come into contact with the needle-arm I', the electric circuit will be thereby closed, the electro-magnet U energized so as to release the catch sustaining the vessel h in its elevated position, whereupon the latter will fall, opening and closing the inlet and exhaust ports, as before described, causing the water to be discharged therefrom and from the water-cylinder below the piston, and simultaneously causing the inflow of water to the cylinder above the piston, which forces the piston down, carrying with it the rod A, and through it the ropes $v$ $w$, attached thereto at one end and at their opposite ends respectively to the draft-doors E of the ash-pit and check-draft G of the smoke-stack, closing the latter and opening the former, as a result of which the fire in the furnace will immediately begin to burn up and produce a corresponding increase in the pressure of steam in the boiler until the maximum pressure is reached, when the electric circuit will be closed through the needle-arm I of the steam-gage, the magnet again operated, and the position of all the parts reversed back to that shown in the drawings. It will be observed that as the piston is forced downward, carrying with it the ropes and the rod M, the collar or projection on the rod will break contact with the contact-plate Q' at the top of the cylinder and make contact with the plate Q at the bottom of the cylinder when the piston has completed its stroke, thus changing the electric circuit, so that it can now be closed only through the high-pressure needle-arm I, which is the next operation to take place, and this changing of the circuit will also continually take place simultaneously with the change of the position of the other parts.

From the foregoing it will be understood that the rod M, with its insulated metallic collar, subserves the sole purpose of a circuit breaker and changer, and that the double electric circuit is always made in the gage and broken by the said rod, the position of which is changed by the action of the piston as soon as either part of the double circuit is closed from one contact-spring to the other, thus always leaving it for the gage to close the double circuit, according as the pressure of the steam in the boiler is high or low. It will also be understood that the draft-doors described are nothing more nor less than valves, and that the same mechanism employed for operating these draft-doors might be utilized for operating any suitable character of valve and for any other purpose than that herein described.

My invention also includes the substitution of a thermostat, and therefore the heat of the furnace for steam-pressure as a force for operating the doors or valves of a furnace, and also a valve controlling the supply of gas to a gas-furnace, for whether through a thermostat the heat of a furnace or through a steam-gage the steam-pressure of a furnace be utilized for the operation of the other parts the result will be precisely the same.

For the purpose of illustrating the embodiment in my invention of a thermostat as a substitution for a steam-gage, and also the adaptability of my invention for automatically actuating a valve for controlling the supply of gas to a gas-furnace and at the same time controlling the door of the furnace, reference is now made to Fig. 12, in which the door E is connected by the cord $v$ with the piston-rod $a$, as before described, the construction and arrangement of the buckets $h$ $i$ and the magnets and the piston-cylinder being precisely the same as before described and shown in Fig. 1, except that the piston-rod $a$ passes entirely through the cylinder for the purposes hereinafter described, and that the bar M is secured by the arm $b$ to the lower projecting end of the piston instead of above, as before shown.

In adapting the double circuit to the thermostat a line-wire 2 from the contact-point 3 of the thermostat (which is of the ordinary construction) connects with the spring-contact Q' on the cylinder, and a line-wire 4 connects the other contact-point 5 of the thermostat with the spring-contact Q on the cylinder, the thermostatic bar being connected by a line-wire 6 with the magnets of the balanced vessels $h$ and $i$. The wire 7 connects one side of the battery with the bar M, the opposite side of the battery being connected with the magnets by a line-wire 8, as clearly shown in the drawings, and through the thermostatic bar by the line 6. By this arrangement of the circuits it will be observed that when the thermostatic bar is in contact with the contact-point 3 the circuit will be made from said bar through the contact-spring Q', the collar R, the wire 7 back to the battery, and thence through the wire 8 to the magnets. At this time the piston is in an elevated position and the receptacle or bucket $h$ filled, so that at the time of completing said circuit, as last above described, the magnet is energized, the receptacle $h$ released, and its contents discharged simultaneously with the discharge of the contents of the cylinder below its piston. Immediately this is done the receptacle $i$ begins to fill and at the same time the cylinder from above the piston, when as the piston is caused to descend the circuit is broken by the breaking of the contact between the collar R and the spring-contact Q', and as soon as the cylinder is filled contact is made between the collar R and the contact Q, except a break in the circuit between the thermostatic bar and the contact-point 5, the circuit is closed through the wire 7, the thermostatic bar, the wire 6 through the magnet and the battery, and thence through the wire 7 to the bar M. Now, assume that when the heat in the furnace passes below the desired minimum the thermostatic bar is forced in contact with the contact-point 3, closing the circuit, the result is that the piston is caused to descend until the collar R is in contact with the contact-spring Q, and the other parts in the position above described, with the circuit made at all points, except between the thermostatic bar and the contact-point 5. If now the temperature is raised above the maximum, the thermostatic bar will make contact with the contact-point 5, again closing the circuit through the wire 4, the thermostat, and the magnet to the battery, instead of, as before, through the wire 2, the thermostat, and the magnet to the battery, thereby energizing the magnet and releasing the receptacle $i$ from the catch of the magnet, and in so doing discharge the water from the receptacle $i$ and the cylinder above the piston and at the same moment a flow of water into the receptacle $h$ at the piston below the cylinder, thus leaving the piston, breaking the contact between the collar R with the spring-contact Q, and finally elevating the collar R with the contact-spring Q' and in position to repeat the operation above described. By this operation of the several parts the cord $v$ will be actuated and in turn open and close or practically close the door E, so as to shut off the supply of air to any furnace, whether for gas or other fuel. In this connection it is proper to add that the furnace-door E in the position shown is practically closed, although admitting air, because at all times some air is necessary for maintaining a low combustion; but it may be entirely closed when the several parts are in the position shown, if so desired, by simply increasing the length of the cord.

In Fig. 12 is also shown an ordinary valve 9, regulating the supply of gas through a supply-pipe 10 of a gas-furnace, and the automatic control of such valve, as before stated, is a part of and in line of the invention already set forth. This control of the gas-regulating valve I propose to accomplish by connecting the valve-rod 11 thereof with the piston-rod $a$ by means of a lever 12, which lever 12 is of the second class and, as shown, is pivoted at one end beyond the valve-stem and slotted to receive pins projecting, respectively, from the valve-stem and the piston, so that when the piston is elevated to the limit of its upward stroke the valve will be unseated and seated when the piston is at the limit of its lower stroke; but any other form of connection may be employed between the piston and the valve, so long as these relative movements of the valve and the piston are maintained.

In operation, when the piston is in its elevated position, the gas-regulating valve will be wide open; but as soon as the temperature of the furnace is above the desired maximum and the piston caused to descend the gas-regulating valve will be seated and cut off the supply of gas until the minimum temperature is reached and the piston, as before fully described, elevated.

My invention, in including the thermostat and gas-regulating valve, or either of them, also includes the rope-connection with a check-draft, as shown in Fig. 1, and so, also, the door E, (shown in Fig. 12,) instead of being the furnace-door, may be the valve or draft controlling the hot or cold air ducts in house-heating and ventilating systems, whereby the supply of hot and cold air is governed by the temperature of the furnace.

Having described my invention, what I claim, and desire to secure by Letters Patent, is—

1. The combination, in a device of the class described, of the oscillating vessels or receptacles, the valve controlled thereby, and a suitable latch for holding and releasing said vessels.

2. In a device of the class described, the combination of the oscillating vessels, a valve controlled thereby, a latch for holding said vessels, and a magnetic releasing device for operating said latch.

3. In a device of the class described, the combination of a closed cylinder, a piston working therein, means for admitting a liquid to said cylinder on alternately opposite sides of said piston, oscillating vessels controlling the admission of the liquid to said cylinder, and an electro-magnet controlling said oscillating vessels, substantially as described.

4. The combination, with a double electric circuit, valves, a closed cylinder, a piston working in said cylinder for operating said valves, a liquid-motor for forcing liquid into said cylinder on alternately opposite sides of said piston, and an electro-magnet controlling said motor included in said circuit, of a circuit breaking and changing device operated by said piston and a circuit-making device included in said circuit, substantially as described.

5. The combination of a double electric circuit, valves, a closed cylinder, a piston working therein for operating said valves, the piston-rod, an insulated sliding rod attached thereto, constituting one terminal of both parts of the electric circuit, a metallic collar thereon, and insulated springs projecting into the path of movement of said collar and each constituting a terminal of one part of said circuit, substantially as described.

6. The combination, with a double electric circuit and valves of a circuit-closing device, a closed chamber, a piston working therein for operating the valves, and a circuit breaking and changing device also operated by said piston, of a liquid-motor consisting of two closed vessels having a common source of supply and a common exhaust, valves for alternately cutting off and admitting the supply of liquid thereto, and pipes connecting said vessels respectively with the closed cylinder above and below the piston, substantially as described.

ALBERT M. BUTZ.

Witnesses:
JNO. G. ELLIOTT,
R. C. OMOHUNDRO.